United States Patent
Zhang et al.

(10) Patent No.: US 7,944,926 B2
(45) Date of Patent: May 17, 2011

(54) METHOD AND SYSTEM FOR MIGRATING A PEER IN A DISTRIBUTED BGP SYSTEM

(75) Inventors: Lixin Zhang, Shenzhen (CN); Boyan Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 12/393,289

(22) Filed: Feb. 26, 2009

(65) Prior Publication Data

US 2009/0213862 A1 Aug. 27, 2009

(30) Foreign Application Priority Data

Feb. 27, 2008 (CN) .......................... 2008 1 0005295

(51) Int. Cl.
*H04L 12/28* (2006.01)

(52) U.S. Cl. .................... 370/395.31; 370/401

(58) Field of Classification Search .................. 370/254, 370/255, 395.2, 395.21, 395.3, 395.31, 400, 370/401

See application file for complete search history.

(56) References Cited

U.S. PATENT DOCUMENTS

| | | | | |
|---|---|---|---|---|
| 6,704,795 B1 * | 3/2004 | Fernando et al. | ............ | 709/237 |
| 7,508,772 B1 * | 3/2009 | Ward et al. | ..................... | 370/254 |
| 7,688,714 B2 * | 3/2010 | Nalawade et al. | ............ | 370/217 |
| 7,710,899 B1 * | 5/2010 | Ward et al. | ..................... | 370/254 |
| 2002/0165980 A1 * | 11/2002 | Brown | ......................... | 709/242 |
| 2005/0213498 A1 * | 9/2005 | Appanna et al. | ............. | 370/216 |
| 2006/0198322 A1 | 9/2006 | Hares et al. | | |
| 2006/0209851 A1 * | 9/2006 | Scudder et al. | ............. | 370/401 |
| 2007/0014231 A1 * | 1/2007 | Sivakumar et al. | .......... | 370/216 |
| 2007/0097974 A1 * | 5/2007 | Ward et al. | ..................... | 370/392 |
| 2008/0031239 A1 * | 2/2008 | Kapoor et al. | ................ | 370/389 |
| 2008/0089231 A1 * | 4/2008 | Appanna et al. | ............. | 370/235 |

FOREIGN PATENT DOCUMENTS

| | | |
|---|---|---|
| CN | 101164307 | 6/2007 |
| WO | WO 2009/105983 | 9/2009 |

\* cited by examiner

Primary Examiner — Hong Cho
(74) Attorney, Agent, or Firm — Finnegan, Herderson, Farabow, Garrett & Dunner LLP

(57) ABSTRACT

A method for peer migration in a distributed Border Gateway Protocol (BGP) system includes: disconnecting a peer relationship between a source BGP process and a network device, wherein first routing information received from the network device is recorded in a forwarding instruction process; establishing a peer relationship between a target BGP process and the network device, and receiving second routing information from the network device; and updating the first routing information recorded in the forwarding instruction process according to the second routing information.

14 Claims, 7 Drawing Sheets

METHOD AND SYSTEM FOR MIGRATING A PEER IN A DISTRIBUTED BGP SYSTEM

This application claims the priority of Chinese patent application No. 200810005295.6, filed Feb. 27, 2008, titled "Method and System for Migrating a Peer in a Distributed BGP System", the contents of which is incorporated herein by reference in its entirety.

FIELD OF THE INVENTION

The present disclosure relates to network communication technologies, and in particular, to a method and system for peer migration in a distributed Border Gateway Protocol (BGP) system.

BACKGROUND

With the development of Internet Protocol (IP) technologies, global Internet users are growing and Internet routes are also growing. Because now Internet routes are mainly advertised using the Border Gateway Protocol (BGP), such growth imposes a new challenge to BGP. To tackle the new challenge, distributed BGP is designed so that BGP neighbor (that is peer) handlings are distributed in different BGP processes and each BGP process handles only peers related to it. In this way, a centralized handling is changed to a distributed handling.

Two types of BGP processes run on network devices in a distributed BGP system: Peer Distributed BGP (PD-BGP) process and Center BGP (C-BGP) process. There may be multiple PD-BGP processes and different PD-BGP processes handle different peers.

Because system load is related to the running state of the system (such as the number of routes, route flapping and policy), some PD-BGP processes may be subject to imbalance of loads; or with the growth of services, one PD-GBP process may become unable to bear the original peers within the BGP process. Both the above situations require the peers to be migrated from one PD-BGP process to another PD-BGP process, or from a PD-BGP process to a C-BGP process, or from a C-BGP process to a PD-BGP process.

SUMMARY

Embodiments of the present invention provide a method and system for peer migration in a distributed Border Gateway Protocol (BGP) system, during migration of peers in the distributed BGP system normal forwarding services are not affected.

A method for peer migration in a distributed Border Gateway Protocol (BGP) system includes: disconnecting a peer relationship between a source BGP process and a network device, wherein first routing information received from the network device is recorded in a forwarding instruction process; establishing a peer relationship between a target BGP process and the network device, and receiving second routing information from the network device; and updating the first routing information recorded in the forwarding instruction process according to the second routing information.

A distributed BGP system includes a peer disconnecting unit, a peer setup unit and a route updating unit. The peer disconnecting unit is adapted to disconnect a BGP peer relationship between a source BGP process and a network device. The peer setup unit is adapted to set up a BGP peer relationship between a target BGP process and the network device, and receive first routing information from the network device. The route updating unit is adapted to update second routing information recorded in a forwarding instruction process which is received from the network device, according to the first routing information received by the target BGP process from the network device.

A method for peer migration in a distributed BGP system includes negotiating a graceful restart (GR) function with a network device; and performing a peer migration for the network device.

A distributed BGP system includes a GR negotiation control unit and a peer migrating unit. The GR negotiation control unit is adapted to negotiate with a network device to enable a graceful function. The peer migrating unit is adapted to perform a peer migration for the network device.

A computer readable media includes logic encoded in the computer readable media, the logic when executed is operable to: disconnect a peer relationship between a source BGP process and a network device, wherein first routing information received from the network device is recorded in a forwarding instruction process; establish a peer relationship between a target BGP process and the network device, and receiving second routing information from the network device; and update the first routing information recorded in the forwarding instruction process according to the second routing information.

BRIEF DESCRIPTION OF THE DRAWING(S)

Figure 3:
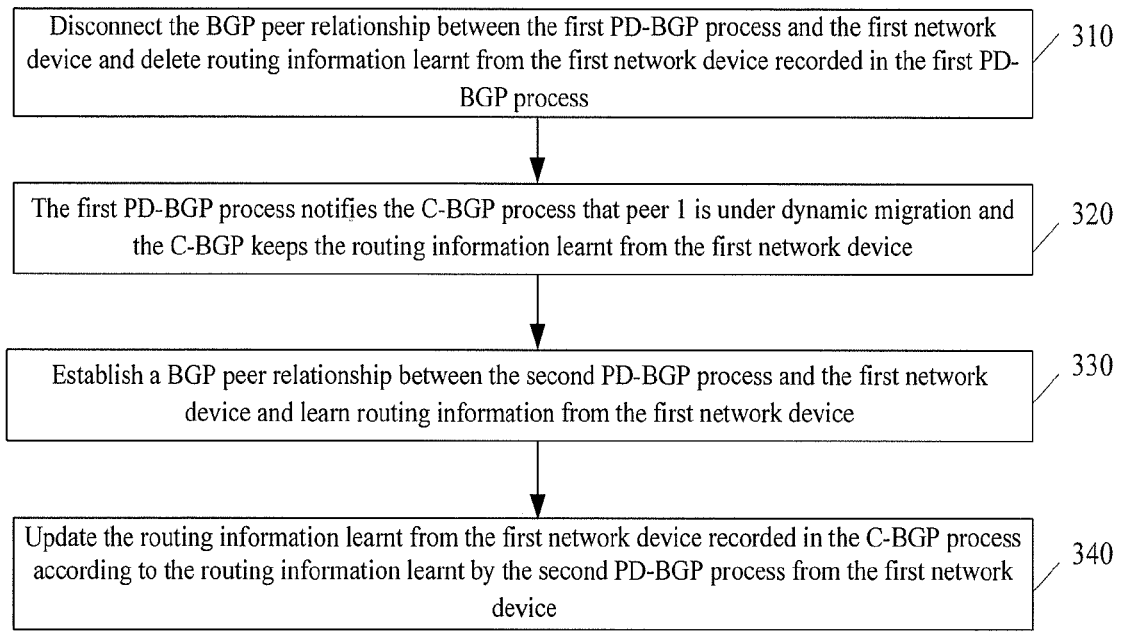
FIG. 3 is a schematic flowchart of the method for peer migration in a distributed BGP system according to an embodiment of the invention.
Figure 4:
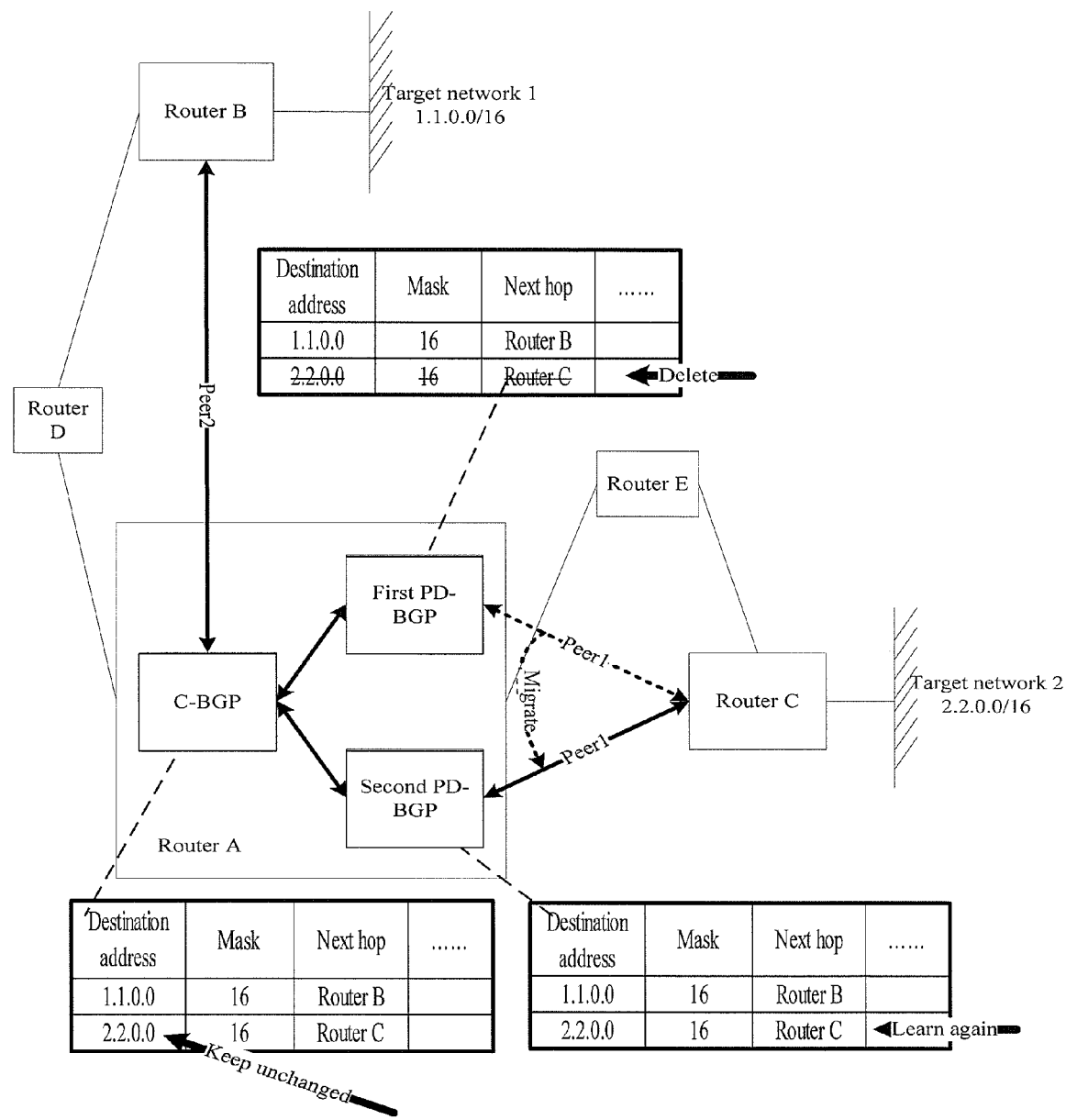
Figure 5:
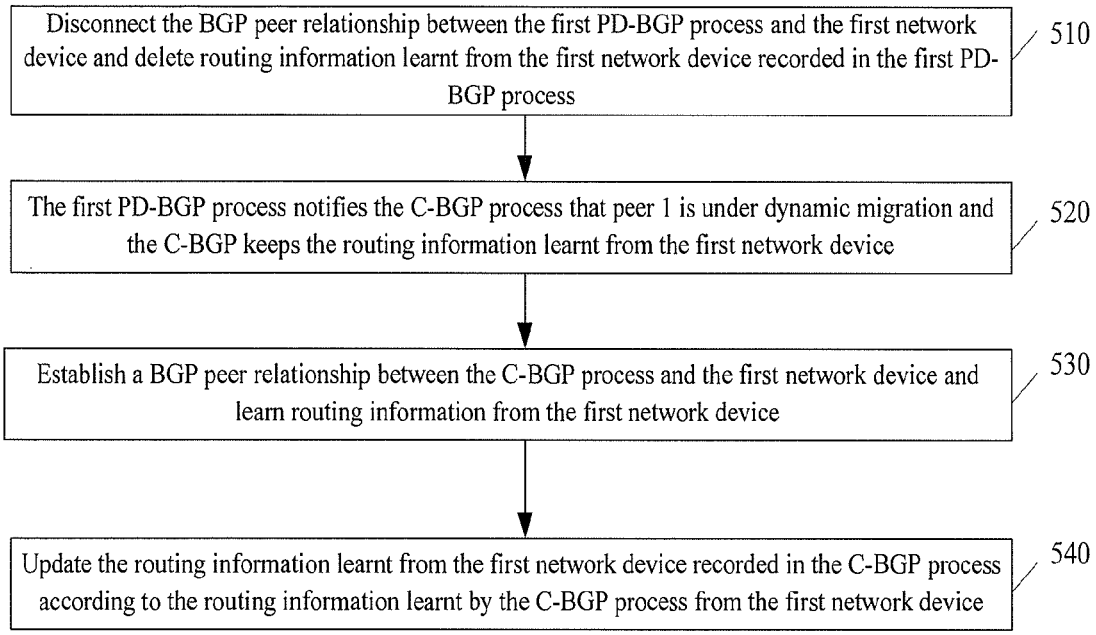
Figure 6:
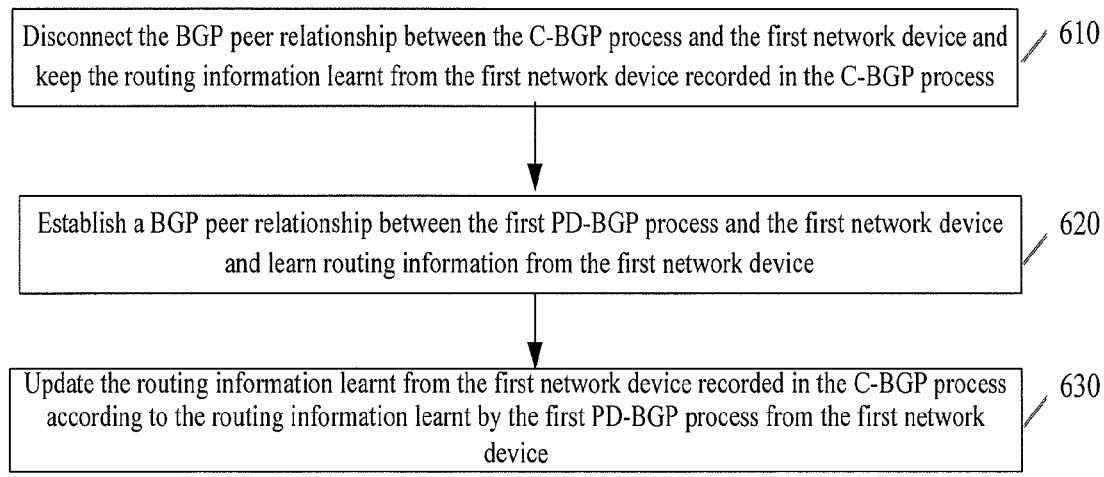
Figure 7:
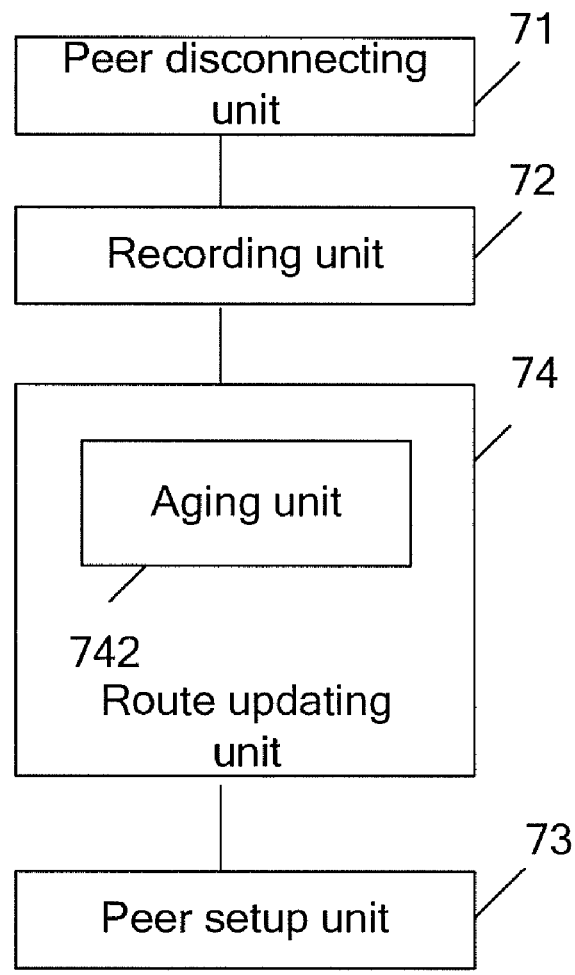
Figure 8:
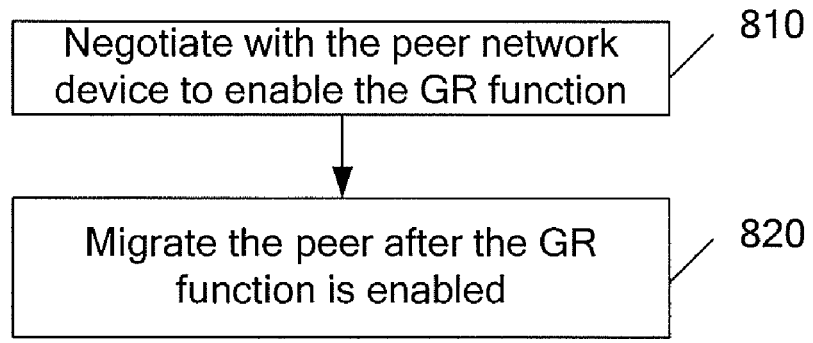
Figure 9:
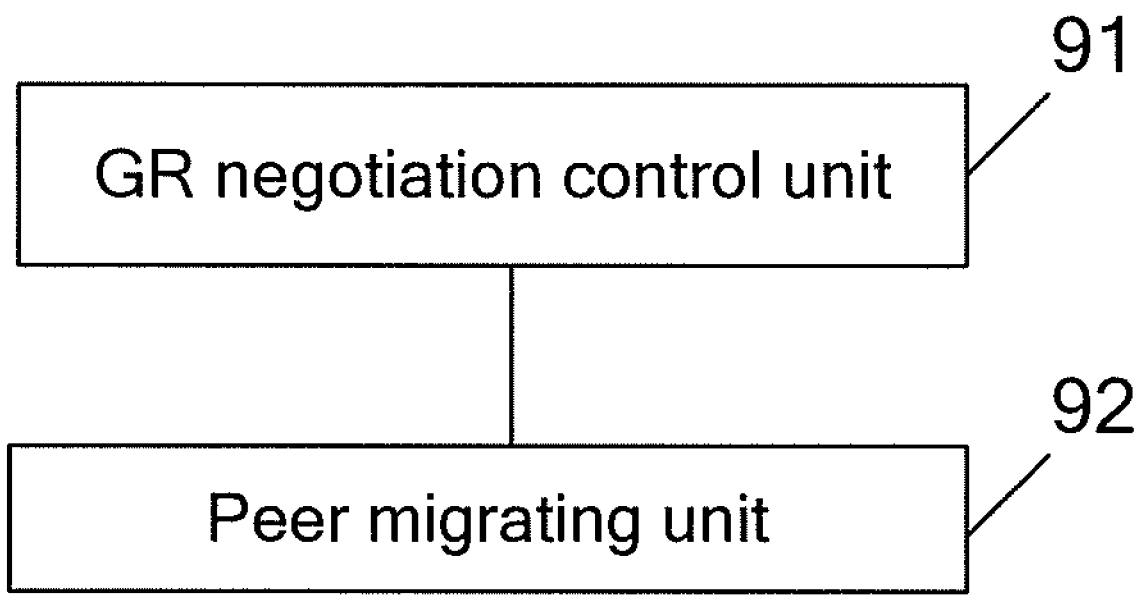

FIG. 4 gives a specific example illustrating the flowchart of the method shown in FIG. 3 according to an embodiment of the invention;

FIG. 5 shows a schematic flowchart of the method for peer migration in a distributed BGP system according to an embodiment of the invention;

FIG. 6 shows a schematic flowchart of the method for peer migration in a distributed BGP system according to an embodiment of the invention;

FIG. 7 shows a schematic structure of a distributed BGP system for peer migration according to an embodiment of the invention;

FIG. 8 shows a schematic flowchart of the method for peer migration according to an embodiment of the invention; and FIG. 9 shows a schematic structure of a distributed BGP system for peer migration according to an embodiment of the invention.

DETAILED DESCRIPTION

Figure 1:
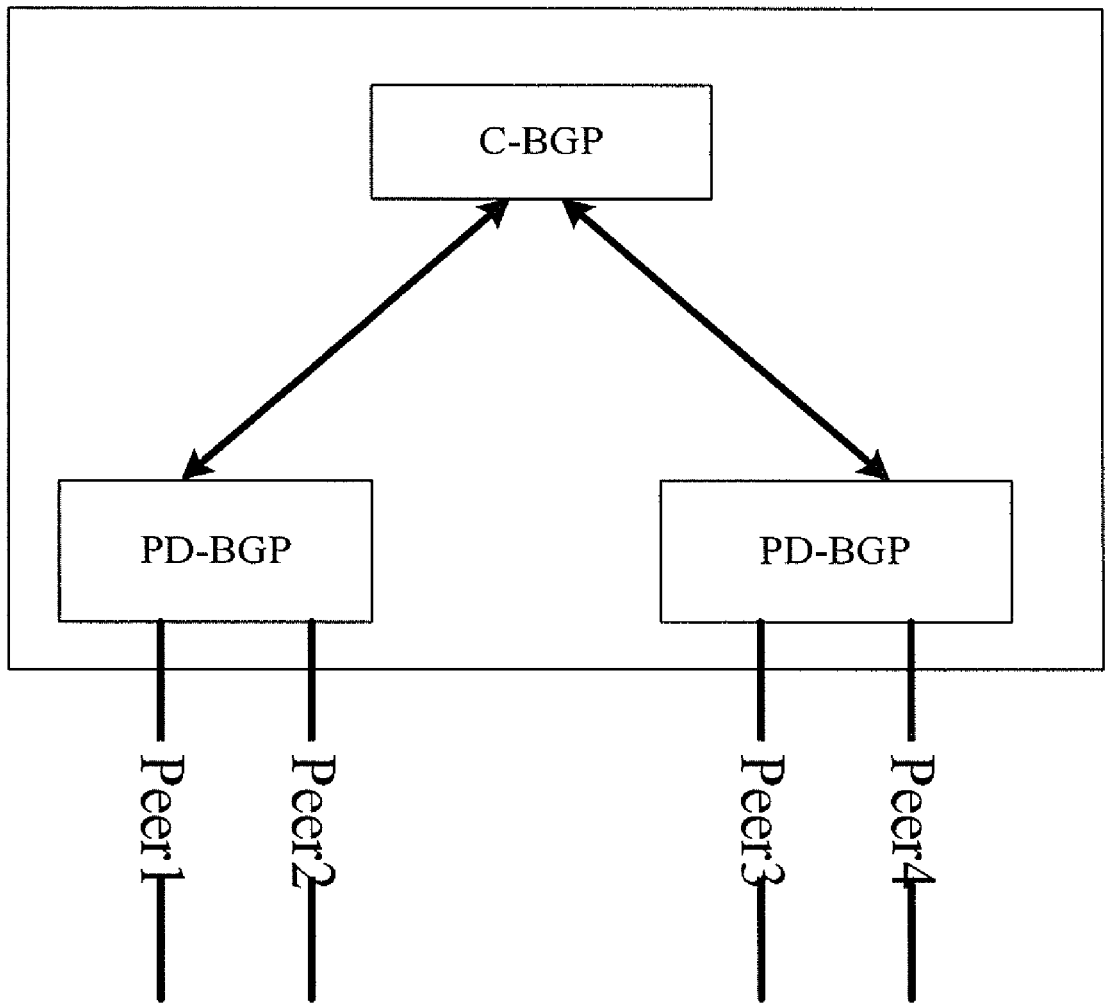
FIG. 1 shows an application environment of a distributed BGP system according to an embodiment of the invention.
Figure 2:
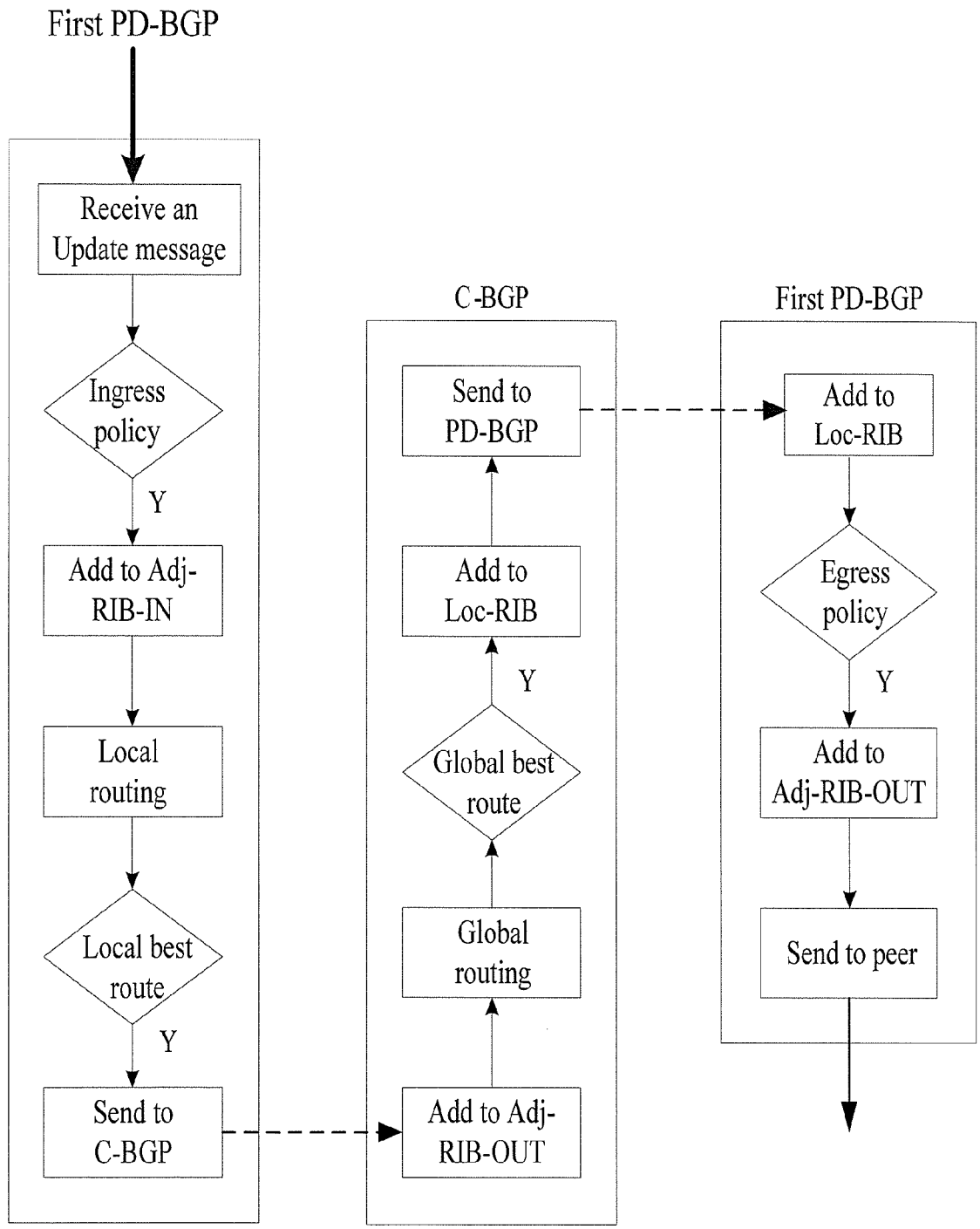
FIG. 2 is a schematic workflow of the BGP system shown in FIG. 1.

As shown in FIG. 1, two types of Border Gateway Protocol (BGP) processes run in a distributed BGP system: a Peer Distributed BGP (PD-BGP) process and a Center BGP (C-BGP) process. There may be multiple BP-BGP processes in the system while different PD-BGP processes handle different peers. Major functions of a PD-BPG process include:

(1) receiving routing information from peers;

(2) performing an ingress policy filtering;

(3) selecting local optimal routing information and sending the local optimal routing information to a C-BGP process;

(4) receiving global optimal routing information sent by the C-BGP process and sending the global optimal routing information to peers; and (5) performing an egress policy filtering.

Functionally, the PD-BGP process mainly receives and sends routing information and performs a local routing. PD-BGP processes only send local preferred routing information to the C-BGP process so that the C-BGP process only stores routing information that may be preferred. This reduces the usage of memory occupied by the C-BGP process. In addition, PD-BGP processes perform the ingress policy filtering and the egress policy filtering, (this may occupy a large part of central processing unit (CPU) resources), and thus reduce the usage of CPU by the C-BGP process.

Functions of a C-BGP process mainly include:

(1) receiving the local optimal routing information from all PD-BGP processes and selecting the global optimal routing information;

(2) generating a forwarding table entry according to the global optimal routing information to instruct forwarding; and (3) sending the global optimal routing information to the PD-BGP processes so that all the PD-BGP processes can send the global optimal routing information to the respective peers.

Functionally, the C-BGP process implements all the basic functions of the BGP, including the ingress and egress policies for the peers. In addition, like a PD-BGP process, the C-BGP process may configure the peers and further process the configured peers. For example, a first PD-BGP process processes the peer 1 and peer 2; a second PD-BGP process processes the peer 3 and peer 4; and the C-BGP process processes the peer 5 and peer 6.

The first PD-BGP process receives a message (for example, an Update message) from a peer network device and further receives routing information from the peer network device. The first PD-BGP process stores the routing information in a BGP peer ingress routing table (Adj-RIB-IN), the BGP creates one Adj-RIB-IN for each peer. Then the first PD-BGP process performs a local routing to get a local optimal route, and sends the local optimal routing information to the C-BGP process. The C-BGP process adds the received local optimal routing information to an Adj-RIB-IN and performs a global routing. The C-BGP process adds the global optimal routing information to a BGP local routing table (Loc-RIB). The routing information in the Loc-RIB forms a routing information base (RIB). The C-BGP process sends the global optimal routing information in the Loc-RIB to the first PD-BGP process and the PD-BGP process adds the received global optimal routing information to its own Loc-RIB. After an egress policy filtering, the first PD-BGP process adds the global optimal routing information in the Loc-RIB to a BGP peer egress routing table (Adj-RIB-OUT) which records the routing information sent to the peers, and sends the global optimal routing information to the corresponding peers.

FIG. 3 shows a flowchart of a method for peer migration in a distributed BGP system according to an embodiment of the invention. In the distributed BGP system, at least a first PD-BGP process, a second PD-BGP process and a C-BGP process are running. Suppose peer 1 (first peer network device) is currently managed by the first PD-BGP process and the peer 1 needs to be migrated, for some specific requirements, to the second PD-BGP process. In this embodiment and other embodiments of the invention, the BGP process managing a peer before migration is defined as a source BGP process and the BGP process managing the peer after migration is defined as a target BGP process.

The migration is as follows:

Process 310: Disconnecting the BGP peer relationship between the first PD-BGP process and the first network device and deleting the routing information received from the first network device recorded in the first PD-BGP process.

Specifically, deleting the configuration information related to peer 1 in the first PD-BGP process, disconnecting the BGP peer relationship between the first PD-BGP process and the first network device and deleting the routing information received from the first network device in the first PD-BGP process.

Process 320: The first PD-BGP process notifies the C-BGP process that the peer 1 is under dynamic migration and the C-BGP process keeps the routing information received from the first network device recorded in the C-BGP process. In other words, after the BGP peer relationship between the first PD-BGP process and the first network device is disconnected, the C-BGP still keeps the routing information received from the first network device.

Specifically, the first PD-BGP process does not notify the C-BGP process to delete the routing information received from the first network device recorded in the C-BGP process, but notifies the C-BGP process that the peer 1 is under dynamic migration. The C-BGP process may record the information so as to facilitate the aging processing when the migration of the peer 1 fails or when a peer relationship is established between the target BGP process (the second PD-BGP process) and the first network device.

Process 330: Establishing a peer relationship between the second PD-BGP process and the first network device and receiving routing information from the first network device.

Specifically, the configuration information related to the peer may be re-configured directly in the second PD-BGP process, or may be transferred from the first PD-BGP process to the second PD-BGP process via a command, for example a compound command. Further, the peer relationship between the second PD-BGP and the first network device is established, the second PD-BGP receives the routing information from the first network device, performs a local routing accordingly, and sends the local optimal routing information to the C-BGP process.

Process 340: Updating the routing information received from the first network device recorded in the C-BGP process according to the routing information received by the second PD-BGP process from the first network device.

Specifically, the routing information corresponding to the first network device recorded in the C-BGP process is updated according to the routing information received by the second PD-BGP process from the first network device, and the routing information that is not updated is deleted. In other words, if the routing information received from the first network device recorded in the C-BGP process includes the routing information not received by the second PD-BGP process from the first network device, the routing information that is recorded in the C-BGP process but is not received by the second PD-BGP process is deleted. Thus, this may assure that the routing information from the first network device recorded in the C-BGP process is the latest routing information when the peer 1 is migrated to the second PD-BGP, so as to assure that the service forwarding path is correct and, during the migration, a correct response can be made to any change in the topology of the peer network device. In addition, if the migration of the peer 1 fails, or the migration is not completed successfully within a specified time, the routing information corresponding to the first network device and recorded in the C-BGP process is deleted.

FIG. 4 gives a specific example to illustrate the flowchart of the method shown in FIG. 3 according to an embodiment of the invention.

A local router A has BGP peer relationships with a peer router B and a peer router C respectively. Three BGP processes are running in the router A: a C-BGP process, a first PD-BGP process and a second PD-BGP process. Now, it is necessary to migrate the BGP peer (peer 1) with the router C from the first PD-BGP process to the second PD-BGP process on the router A.

The first PD-BGP process first disconnects the BGP peer relationship with the router C, and deletes the routing information (2.2.0.0/16) learnt from the router C, the C-BGP process still keeps the routing information so that the router A is not impacted in instructing forwarding services.

For example, during the migration of the peer 1, the packets from the router B (for example, the packets has a source address 1.1.0.0 and a destination address 2.2.0.0) can still be sent to the router C via the router D, the router A and the router E and finally sent to the destination network 2.2.0.0. Since the router A keeps the routing information corresponding to the router C that is used to instruct forwarding in the C-BGP process, failure of forwarding the packets to the router C from the router A will not happen because the router A has the routing information corresponding to the router C during migration.

Further, before the migration of the peer 1, the router A and the router C may negotiate to enable the graceful restart (GR) function so that when the BGP peer relationship between the router A and the router C is disconnected, the router C still keeps the routing information previously learnt from the router A. Thus, the forwarding information corresponding to the router A is kept and therefore, data can be sent to the router A via the router E. This ensures that the forwarding in the router C is not interrupted.

When the peer 1 is migrated to the second PD-BGP process on the router A, the second PD-BGP process sets up a peer relationship with the router C again and receives routing information from the router C. The second PD-BGP updates the routing information to the C-BGP process so that the subsequent forwarding path is correct.

FIG. 5 shows a flowchart of a method for peer migration in a distributed BGP system according to an embodiment of the invention. In this embodiment, peer 1 is migrated to the C-BGP process. The C-BGP process not only can perform a global routing and instruct forwarding, but also can managing the peers like the PD-BGP process.

Process 510: Disconnecting the BGP peer relationship between the first PD-BGP process and the first network device and deleting the routing information received from the first network device recorded in the first PD-BGP process. The specific implementation is the similar to Process 310.

Process 520: The first PD-BGP process notifies the C-BGP process that the peer 1 is under dynamic migration, and the C-BGP process keeps the routing information received from the first network device recorded in the C-BGP process. In other words, after the BGP peer relationship between the first PD-BGP process and the first network device is disconnected, the C-BGP process still keeps the routing information received from the first network device.

Specifically, the first PD-BGP process does not notify the C-BGP process to delete the routing information which is received from the first network device and recorded in the C-BGP process, but notifies the C-BGP process that the peer 1 is under dynamic migration. Then the C-BGP process can record the information so as to facilitate the aging processing when the migration of peer 1 fails or when a peer relationship is set up between the target BGP process (the C-BGP process) and the first network device.

Process 530: Establishing a peer relationship between the C-BGP process and the first network device and receiving the routing information from the first network device.

Specifically, the configuration information related to the peer 1 may be re-configured directly on the C-BGP process, or may be transferred from the first PD-BGP process to the C-BGP process via a command, for example a compound command. Thus, the peer relationship is established between the C-BGP process and the first network device, and the C-BGP process receives the routing information from the first network device.

Process 540: Updating the routing information which is received from the first network device and recorded in the C-BGP process according to the routing information received by the C-BGP process from the first network device.

Specifically, the routing information corresponding to the first network device and recorded in the C-BGP process is updated according to the routing information received by the C-BGP process from the first network device, and the routing information that is not updated is deleted. In other words, if the routing information which is received from the first network device and recorded in the C-BGP process includes the routing information not received by the C-BGP process from the first network device, the routing information that is recorded in the C-BGP process but is not received by the C-BGP process is deleted. Then, the C-BGP process performs a normal global route selection to get a latest global optimal route so as to ensure that the latest routing information of the first network device is recorded in the C-BGP process after peer 1 is migrated to the C-BGP process and that the service forwarding path is correct. In addition, a correct response can be made to any change in the topology of the peer network device.

In addition, if the migration of the peer 1 fails, or the migration is not completed successfully within a specified time, the routing information which is received from the first network device and recorded in the C-BGP process is deleted.

FIG. 6 shows a flowchart of the method for peer migration in a distributed BGP system according to an embodiment of the invention. In this embodiment, the peer 1 is migrated from a C-BGP process to a first PD-BGP process. The C-BGP process not only can perform a global routing and instruct forwarding, but also handle the peers like a PD-BGP process.

Process 610: Disconnecting the BGP peer relationship between the C-BGP process and the first network device and keeping the routing information received from the first network device recorded in the C-BGP process. In other words, after the BGP peer relationship between the C-BGP process and the first network device is disconnected, the C-BGP process still keeps the routing information received from the first network device.

Specifically, deleting the configuration information related to the peer 1 in the C-BGP process, disconnecting the BGP peer relationship with the first network device and keeping the routing information received from the first network device recorded in the C-BGP. In addition, the C-BGP process may also record that the peer 1 is under dynamic migration.

Process 620: Establishing a BGP peer relationship between the first PD-BGP process and the first network device and receiving routing information from the first network device.

Specifically, the configuration information related to peer 1 may be re-configured directly on the first PD-BGP process, or may be transferred from the C-BGP process to the first PD-BGP process via a command, for example a compound command. Further, the first PD-BGP process establishes the BGP peer relationship with the first network device, receives the routing information from the first network device, performs a local routing accordingly, and sends the local optimal routing information to the C-BGP process.

Process 630: Updating the routing information which is received from the first network device and recorded in the C-BGP process according to the routing information received by the first PD-BGP process from the first network device.

In addition, if the migration of the peer 1 fails, or the migration is not completed successfully within a specified time, the routing information corresponding to the first network device recorded in the C-BGP process is deleted.

FIG. 7 shows a schematic structure of a distributed BGP system for peer migration according to an embodiment of the invention. The distributed BGP system includes a peer disconnecting unit 71, a recording unit 72, a peer setup unit 73 and a route updating unit 74.

The peer disconnecting unit 71 is adapted to disconnect the BGP peer relationship between the source BGP process and the peer network device; the recording unit 72 is adapted to record the routing information received from the peer network device in the C-BGP process and keep the record after the BGP peer relationship between the source BGP process and the peer network device is disconnected; the peer setup unit 73 is adapted to establish a BGP peer relationship between the target BGP process and the peer network device and receive routing information from the peer network device; the route updating unit 74 is adapted to update the routing information which is received from the peer network device and recorded in the C-BGP process according to the routing information received by the target BGP process from the peer network device.

The route updating unit 74 may further include an aging unit 742. The aging unit 742 is adapted to delete the routing information that is recorded in the C-BGP process but is not received by the target BGP process when the routing information which is received from the first network device and recorded in the C-BGP process includes the routing information not received by the target BGP process from the first network device. The route updating unit 74 is designed to ensure the consistency between the routing information corresponding to the peer network device and recorded in the C-BGP process and the routing information received by the target BGP process from the peer network device after the peer migration, and further ensure the correctness of the forwarding path and the correct response to any change in the topology in the peer network during the migration.

The distributed BGP system may further include a GR negotiation control unit, adapted to negotiate with the peer network device to enable the GR function before the peer migration. Due to the existence of the GR negotiation control unit, the forwarding service on the peer network device is not impacted during the peer migration.

Because there are different means of peer migration, the source BGP process in the embodiments of the invention may be a first PD-BGP process and the target BGP process is a second PD-BGP process; or the source BGP process is a first PD-BGP process and the target BGP process is a C-BGP process; or the source BGP process is a C-BGP process and the target BGP process is a first PD-BGP process.

When the source BGP process is a first PD-BGP process, the distributed BGP system may further include a first deleting unit, adapted to delete the routing information corresponding to the peer network device recorded in the first PD-BGP process after the BGP peer relationship between the first PD-BGP process and the peer network device is disconnected; and a migration notifying unit, adapted to notify the C-BGP process that the peer network device is under dynamic migration after the BGP peer relationship between the first PD-BGP process and the peer network device is disconnected. When the source BGP process is a C-BGP process, the distributed BGP system may not include the above first deleting unit and the migration notifying unit.

It is understood that the distributed BGP system in the above embodiments of the invention may be a specific network device, for example a router or a layer-3 switch etc. In addition, because the major function of the C-BGP process is to collect routing information received by all the PD-BP processes to instruct forwarding, a special process may be included in a distributed BGP system to provide the forwarding instruction function of the C-BGP process. Therefore, the above special process and the C-BGP process may be called together a forwarding instruction process. Accordingly, the technical scheme implemented in the C-BGP process in the above embodiments of the invention, for example keeping the routing information received from the peer network device recorded in the C-BGP process during the peer migration and updating the routing information etc., may be implemented in the forwarding instruction process.

The routing information recorded in the forwarding instruction process is adapted to instruct service forwarding. During the peer migration, the routing information which is received from the peer network device and recorded in the forwarding instruction process of the distributed BGP system is kept and the routing information recorded in the forwarding instruction process is updated according to the routing information received by the target BGP process after the migration. As a result, the service forwarding of the distributed BGP system is not impacted during the migration.

In addition, because the GR function is enabled for the peer network device, the peer network device keeps the routing information previously recorded after the peer relationship with the peer network device is disconnected during the migration. Therefore, the service forwarding on the peer network device is not impacted during the peer migration process.

FIG. 8 shows a flowchart of the method for peer migration in a distributed BGP system according to an embodiment of the invention.

Process 810: Negotiating with the peer network device to enable the GR function.

Process 820: Migrating the peer after the GR function is enabled.

The peer migration may follow the technical scheme implemented in the above embodiments of the invention.

In addition, the technical scheme below may be followed:

Disconnect the BGP peer relationship between the source BGP process and the peer network device and delete the routing information received from the peer network device recorded in the forwarding instruction process; set up a BGP peer relationship between the target BGP process and the peer network device and receive routing information from the peer network device; and send the routing information received by the target BGP process from the peer network device to the forwarding instruction process.

Though the routing information received from the peer network device recorded in the forwarding instruction process is not kept during the peer migration, because the GR function is enabled in Process 810, when the local network device (a second network device) migrates its peer relationship with the peer network device (a first network device), for example the second network device disconnects the peer relationship with the first network device, the second network device keeps the previously-recorded routing information received from the first network device. As a result, the service forwarding on the first network device is not affected by the peer migration.

FIG. 9 shows a schematic structure of a distributed BGP system for peer migration according to an embodiment of the invention. The distributed BGP system in this embodiment includes a GR negotiation control unit 91 and a peer migrating unit 92.

The GR negotiation control unit 91 is adapted to negotiate with the peer network device to enable the GR function before peer migration.

The peer migrating unit 92 may be implemented in various ways, for example, the structure shown in FIG. 7.

The peer migrating unit 92 may also adopt the following structure: the peer migrating unit includes: a peer disconnecting unit, adapted to disconnect the BGP peer relationship between the source BGP process and the peer network device; a second deleting unit, adapted to delete the routing information received from the peer network device when the BGP peer relationship between the source BGP process and the peer network device is disconnected; a peer setup unit, adapted to set up a BGP relation between the target BGP process and the peer network device and receive routing information from the peer network device; and a route providing unit, adapted to provide the routing information received by the target BGP process from the peer network device for the forwarding instruction process.

In the above implementation of the peer migrating unit 92, the routing information received from the peer network device recorded in the forwarding instruction process is not kept during peer migration, but because the peer migrating unit 92 migrates the peer after the GR negotiation control unit 91 negotiates with the peer network device to enable the GR function, the service forwarding on the peer network device is not impacted during the peer migration.

In an embodiment, computer readable media comprises computer program codes for migrating peer in a distributed BGP system. The computer program codes may be logic encoded in one or more tangible media for execution. As used herein, logic encoded in one or more tangible media is defined as instructions that are executable by a programmed processor and that are provided on computer-readable storage media, memories, or a combination thereof. When executed, the logic is operable to disconnect a peer relationship between a source BGP process and a network device, wherein first routing information received from the network device is recorded in a forwarding instruction process; establish a peer relationship between a target BGP process and the network device, and receiving second routing information from the network device; and update the first routing information recorded in the forwarding instruction process according to the second routing information. When executed, the logic encoded in one or more tangible media is also operable to negotiate a graceful restart (GR) function with a network device; and perform a peer migration for the network device.

Although the invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for peer migration in a distributed Border Gateway Protocol (BGP) system, comprising:
    disconnecting a peer relationship between a source BGP process and a network device, wherein first routing information received from the network device is recorded in a forwarding instruction process;
    establishing a peer relationship between a target BGP process and the network device, and receiving second routing information from the network device;
    updating the first routing information recorded in the forwarding instruction process according to the second routing information.

2. The method according to claim 1, wherein the updating process comprises:
    deleting routing information not received by the target BGP process from the first routing information recorded in the forwarding instruction process if the first routing information comprises the routing information not received by the target process.

3. The method according to claim 1, before the disconnecting process, the method further comprising:
    negotiating with the network device to enable a graceful restart (GR) function.

4. The method according to claim 1, wherein
    the source BGP process is a first Peer Distributed BGP (PD-BGP) process and the target BGP process is a second PD-BGP process; or
    the source BGP process is a first Peer Distributed BGP (PD-BGP) process and the target BGP process is a center BGP (C-BGP) process; or
    the source BGP process is a C-BGP process and the target BGP process is a first PD-BGP process.

5. The method according to claim 1, comprising:
    deleting routing information recorded in the source BGP process which is received from the network device after disconnecting the BGP peer relationship between the source BGP process and the network device.

6. The method according to claim 1, comprising:
    notifying, by the source BGP process, the forwarding instruction process that the network device is under dynamic migration.

7. A distributed Border Gateway Protocol (BGP) system, comprising:
    a peer disconnecting unit, configured to disconnect a BGP peer relationship between a source BGP process and a network device;
    a peer setup unit, configured to set up a BGP peer relationship between a target BGP process and the network device, and receive first routing information from the network device; and
    a route updating unit, configured to update second routing information recorded in a forwarding instruction process which is received from the network device, according to the first routing information received by the target BGP process from the network device.

8. The system according to claim 7, wherein the route updating unit comprises an aging unit configured to delete routing information not received by the target BGP process from the second routing information recorded in the forwarding instruction process, if the second routing information recorded in the forwarding instruction process comprises the routing information not received by the target BGP process from the network device.

9. The system according to claim 7, further comprising:
    a deleting unit configured to delete routing information recorded in the source BGP process which is received from the network device after disconnecting the BGP peer relationship between the source BGP process and the network device.

10. The system according to claim 7, further comprising:
a migration notifying unit configured to notify the forwarding instruction process that the network device is under dynamic migration after disconnecting the BGP peer relation between the source BGP process and the network device.

11. The system according to claim 7, further comprising a graceful restart (GR) negotiation control unit, configured to negotiate with the network device to enable a GR function after the BGP peer relationship between the source BGP process and the network device is disconnected.

12. A method for peer migration in a distributed Border Gateway Protocol (BGP) system, comprising:
   negotiating a graceful restart (GR) function with a network device; and
   performing a peer migration for the network device,
   wherein performing the peer migration for the network device comprises:
      disconnecting a BGP peer relationship between a source BGP process and the network device, and deleting first routing information recorded in a forwarding instruction process which is received from the network device;
      establishing a BGP peer relationship between a target BGP process and the network device, and receiving second routing information from the network device; and
      providing the second routing information to the forwarding instruction process.

13. A distributed Border Gateway Protocol (BGP) system, comprising:
   a GR negotiation control unit, configured to negotiate with a network device to enable a graceful function; and
   a peer migrating unit, configured to perform a peer migration for the network device,
   wherein the peer migration unit comprises:
      a peer disconnecting unit, configured to disconnect a BGP peer relationship between a source BGP process and the network device;
      a deleting unit, configured to delete first routing information recorded in a forwarding instruction process which is received from the network device;
      a peer setup unit, configured to establish a BGP peer relationship between a target BGP process and the network device, and receive second routing information from the network device; and
      a route providing unit, configured to provide the second routing information to the forwarding instruction process.

14. A non-transitory computer readable media, comprising logic encoded in the computer readable media, the logic when executed operable to:
   disconnect a peer relationship between a source BGP process and a network device, wherein first routing information received from the network device is recorded in a forwarding instruction process;
   establish a peer relationship between a target BGP process and the network device, and receiving second routing information from the network device; and
   update the first routing information recorded in the forwarding instruction process according to the second routing information.

* * * * *